(12) United States Patent
Hepkin et al.

(10) Patent No.: US 8,458,431 B2
(45) Date of Patent: Jun. 4, 2013

(54) EXPANDING MEMORY SIZE

(75) Inventors: David Alan Hepkin, Austin, TX (US); Satya Prakash Sharma, Austin, TX (US); Saurabh Nath Sharma, Austin, TX (US); Randal Craig Swanberg, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 699 days.

(21) Appl. No.: 12/611,190

(22) Filed: Nov. 3, 2009

(65) Prior Publication Data

US 2011/0107054 A1 May 5, 2011

(51) Int. Cl.
*G06F 12/00* (2006.01)

(52) U.S. Cl.
USPC .................................. 711/172; 711/E12.001

(58) Field of Classification Search
None
See application file for complete search history.

(56) References Cited

U.S. PATENT DOCUMENTS

| | | | |
|---|---|---|---|
| 5,699,539 A * | 12/1997 | Garber et al. ............... | 711/2 |
| 6,564,305 B1 | 5/2003 | Moore | |
| 6,681,305 B1 | 1/2004 | Franke et al. | |
| 6,879,266 B1 | 4/2005 | Dye et al. | |
| 2002/0178333 A1 | 11/2002 | Wilson et al. | |

OTHER PUBLICATIONS

European Patent Office, International Search Report, EP2010/065361, Mar. 28, 2011, UK.
Abali et al; "Memory expansion technology (MXT): Software support and performance", J. Res. & Dev; vol. 45, No. 2, Mar. 2001.
Tuduce et al; "Adaptive Main Memory Compression", 2005 USENIX Annual Technical Conference, 237-250, Zurich, Switzerland, 2005.
M. Kjelso et al; "Performance evaluation of computer architectures with main memory data compression", Elsavier, Journal of systems architectures 45, 1999, 571-590.
Lim-et al.; "Disaggregated Memory for Expansion and Sharing in Blade Severs"; ACM Digital Library; pp. 267-277; Jun. 20-24, 2009.
Likatsas-et al.; "Using Shiftable Content Addressable Memories to Double Memory Capacity on Embedded Systems"; ACM Digital Library; 2006.

* cited by examiner

*Primary Examiner* — Denise Tran
(74) *Attorney, Agent, or Firm* — Garg Law Firm, PLLC; Rakesh Garg; Libby Z. Toub

(57) ABSTRACT

A system, and computer usable program product for expanding memory size are provided in the illustrative embodiments. A desired size of an expanded memory and a first information about a workload in the data processing system are received. A size of a compressed memory pool to use with the memory to make the desired size of the expanded memory available is computed. A representation of the memory is configured, the representation of the memory appearing to be of a size larger than the size of the memory, the representation of the memory being the expanded memory, and the size of the representation being the size of the expanded memory. The expanded memory is made available such that the memory in the data processing system is usable by addressing the expanded memory.

20 Claims, 5 Drawing Sheets

EXPANDING MEMORY SIZE

BACKGROUND OF THE INVENTION

1. Field of the Invention

The present invention relates generally to an improved data processing system, and in particular, to managing memory in a data processing system. Still more particularly, the present invention relates to system, and computer usable program code for offering and accessing an expanded size of a memory in a data processing system.

2. Description of the Related Art

Data processing systems include memory devices for storing, processing, and moving data. A memory device, or memory, is generally a physical component of a data processing system configured to store data. A memory may also include logical or virtual components, such as a space on a hard disk designated to be used as a part of the memory.

A component of the operating system of the data processing system, such as a memory controller, manages the movement of data in and out of the memory, and generally the operation of the memory. Applications and the operating system can use the memory for storing, processing, or moving data they each need for their respective functions.

Data processing systems can be configured in a variety of ways. For example, the components in a data processing system may be configured to operate in a manner such that the data processing system behaves as a single data processing unit. The memory in such a configuration operates to support data manipulation for the single data processing unit.

As another example, data processing systems can be divided into logical partitions (LPARs). Such data processing systems are also known as logical partitioned data processing systems. A logical partition is also known simply as a "partition". Each partition operates as a separate data processing system independent of the other partitions. Generally, a partition management firmware component connects the various partitions and provides the network connectivity among them. A Hypervisor is an example of such partition management firmware.

One or more memory devices may be present in a logical partitioned data processing environment. A partition may access one or more memory devices for manipulating data. Methods exist to address several portions of several memory devices in a manner that the several memory devices appear as a single memory to the applications and the operating system of a partition.

Data compression is a technique used for manipulating data such that a size of storage smaller than the actual size of the data can hold the data. Data compression is used in conjunction with a memory to accommodate more data than the actual size of the memory can hold. For example, 1 Giga Byte (GB) of memory can be made to hold 2 GB of data by suitably compressing the data.

Typically, data is compressed when stored in the memory and uncompressed when an application has to retrieve the data from the memory. Many algorithms for data compression exist and some are suitable for compressing data in memory.

SUMMARY OF THE INVENTION

The illustrative embodiments provide a system, and computer usable program product for expanding memory size in a data processing system. According to the invention, an embodiment in a data processing system having a memory receives a desired size of an expanded memory and a first information about a workload in the data processing system. The embodiment computes a size of a compressed memory pool to use with the memory to make the desired size of the expanded memory available. The embodiment configures a representation of the memory, the representation of the memory appearing to be of a size larger than the size of the memory, the representation of the memory being the expanded memory, and the size of the representation being the size of the expanded memory. The embodiment makes available the expanded memory such that the memory in the data processing system is usable by addressing the expanded memory.

Another embodiment additionally receives an input value corresponding to a performance parameter of the data processing system. The configuring the representation includes determining the size of the representation based on the desired size of the expanded memory, a compression ratio of the workload, and the input value. In one embodiment, the performance parameter is a minimum size of an uncompressed memory pool to avoid thrashing.

In another embodiment, the size of the expanded memory excludes a size of a memory space. The excluded size of the memory space may be the size of memory used for storing a pinned page, a size of memory used for storing a protected page, a size of memory that is reserved for use by an application, or a combination thereof.

Another embodiment determines whether the desired size of the expanded memory can be made available. In response to the determining being false, the embodiment makes the expanded memory available such that the size of the expanded memory is different from the desired size of the expanded memory.

Another embodiment determines whether the desired size of the expanded memory can be made available. In response to the determining being false, the embodiment makes the expanded memory available together with information about a portion of the desired size that cannot be made available.

Another embodiment receives a second information about a change in the workload, a change in the desired size of the expanded memory, or a combination thereof. The embodiment re-computes the size of the compressed memory pool based on the second information and adjusts the size of the compressed memory pool while the data processing system is operational. In one embodiment, the adjusting leaves the size of the expanded memory unchanged.

In one embodiment, the size of the expanded memory is equal to the sum of (i) a product of a compression ratio of the workload and the size of the compressed memory pool and (ii) a difference of the size of the memory and the size of the compressed memory pool.

In another embodiment, addressing the expanded memory is accomplished in the manner of addressing the memory.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
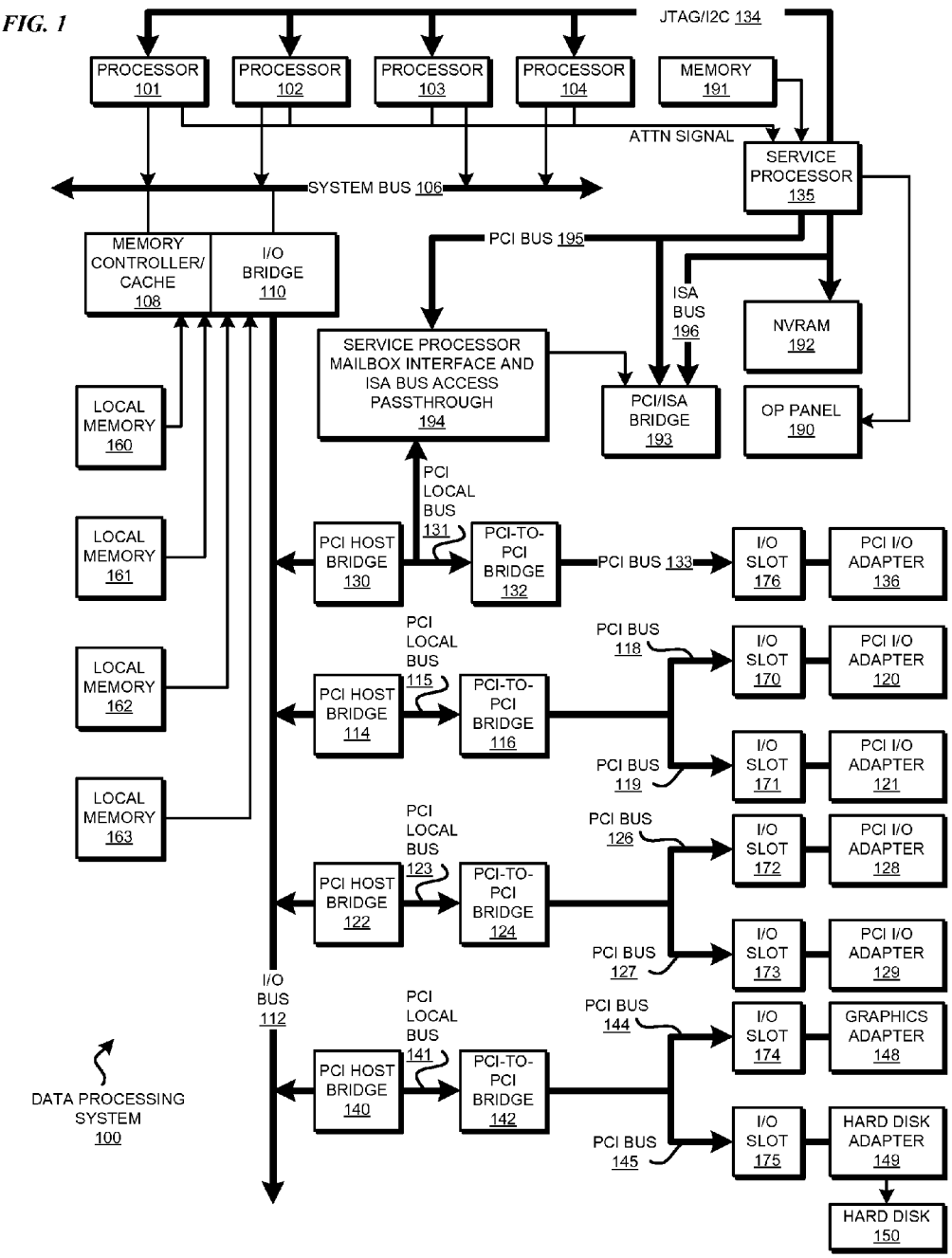
FIG. 1 depicts a block diagram of a data processing system in which the illustrative embodiments may be implemented is depicted.

In the operation of data processing systems, often a need arises to fit more data into available memory than the available memory can hold. Presently, data compression techniques are utilized to compress all or part of the data meant to be stored in the memory such that the size of the compressed data is less than or equal to the size of the available memory. Available memory is the memory usable for storing data in a given data processing system.

The invention recognizes that the size of the memory in a data processing system is often a bottleneck in increasing the throughput of a data processing system. While the capabilities of the processor in the data processing system may allow faster, larger, or more computations than the data processing system may be performing at a given time, the available memory frequently limits the support for those increased computations.

The invention further recognizes that even the data compression techniques used in present memory configurations suffer from certain drawbacks. For example, presently, a memory utilizing data compression may include a compressed memory pool, an uncompressed memory pool, and a paging space. A compressed memory pool is an area of the memory where compressed data is stored. An uncompressed memory pool is another area of the memory where uncompressed data is stored. A paging space is a virtual memory, often a designated space of a hard disk, used as a spillage area for data that cannot be accommodated in the memory. Generally, the compressed memory pool and the uncompressed memory pool account for the available size of the physical memory in a data processing system.

The invention recognizes that in present memory configurations, an application may only access the uncompressed memory pool when reading or writing data in the memory. As an example, a data processing system may include available memory of size 2 GB. 0.5 GB of that available memory may be designated, typically by a user, to be the compressed memory pool. Remainder 1.5 GB of the available memory becomes the uncompressed memory pool. Most of the 1.5 GB of the uncompressed memory pool is what is accessible to the applications, save the portion that the operating system reserves for the operating system's use. In some instances, applications may have the entire memory size, 2 GB in the above example, accessible to them. In such instances, the operating system simply decompresses the page from the compressed memory pool if an application happens to address the page in the compressed memory pool.

Thus, the invention recognizes that the memory accessible by the applications is either only a part of the available memory or at most the whole available memory, but not more than the size of the available memory. Additionally, presently a user has to specify a size of the compressed memory pool. The invention recognizes that specifying the size of the compressed memory pool is a non-trivially complex task for a user, particularly in advance of knowing the compressibility characteristics of data of future workloads that will utilize that compressed memory pool. The invention further recognizes that this method also requires constant monitoring of the partitions in case the specified settings cause problems as the workload evolves or changes.

Furthermore, presently, once the size of the compressed memory pool is specified, that size remains static for the remainder of the operation of the data processing system. The invention recognizes that a static size of compressed memory pool may be unsuitable for processing certain data that may not be compressible into the static size of the compressed memory pool. For example, at some point in the operation of the data processing system, the data of a given workload may be compressible so as to require a smaller than the static size of the compressed memory pool. In such a case, part of the available memory in the compressed memory pool is wasted, adversely affecting the performance of the data processing system.

As another example, at some point in the operation of the data processing system, the data of a given workload may be compressible so as to require a larger than the static size of the compressed memory pool. In such a case, the static size of the compressed memory pool may limit the amount of data that can be compressed, decreasing the performance of the data processing system.

The invention further recognizes that the compressed memory pool is presently used only to speed up the paging process. For example, when an application needs a page of data that is not in the uncompressed memory pool but the compressed memory pool, a page fault is generated. In response to the page fault, a component of the operating system decompresses the page from the compressed memory pool and moves the uncompressed page into the uncompressed memory pool.

To make space for the uncompressed page, the operating system in this example has to move some other pages out of the uncompressed memory pool, compress them, and move them into the compressed memory pool. Because the page fault results in data movement within the memory—between the compressed and the uncompressed memory pools—the paging is faster as compared to the paging speed if data were moved between the virtual paging space and the memory.

The invention recognizes that other than for being available to the operating system for speeding up the paging, the compressed memory pool is unavailable to the applications. The present data compression in memory does not expand the size of the memory accessible to the application beyond the size of the available memory.

The present techniques make at most the size of the available memory accessible to the applications. In fact, some instances of the present data compression in memory reduce the size of the memory accessible to the application to less than the size of the available memory. Even if, hypothetically, any extra memory space in a compressed form could be presently made available to an application, given the present techniques for data compression in memory, the application would have to be modified to make use of the compressed form of such extra memory.

The illustrative embodiments used to describe the invention address and solve these and other problems related to data compression in memory. The illustrative embodiments provide a computer usable program product, and data processing system for expanding the size of the memory such that a larger than actual size of the available memory can become accessible to applications. Using the illustrative embodiments, an application can become aware of the larger size of the memory without requiring any modification to the application code.

Using the illustrative embodiments, an operating system can offer a size of memory accessible to the applications that appears larger than the actual size of memory. Using the illustrative embodiments, an application can access memory that appears to be larger than the actual size of the memory. For example, by using an illustrative embodiment, with a memory of an actual size of 2 GB, and given a certain compression ratio of a workload, an operating system may be able to offer and an application may be able to access 4 GB of memory. The total increased accessible memory is referred to as the expanded memory.

Furthermore, using the illustrative embodiments, only a desired size of the expanded memory has to be specified—a rather uncomplicated and simple task—as compared to predetermining a suitable size of compressed memory pool. A system implementing the illustrative embodiments can then attempt to achieve the desired size of the expanded memory or as close there to as possible under any given workload.

Furthermore, a system implementing the illustrative embodiments can automatically adjust the sizes of the compressed and uncompressed pools, to achieve the desired expanded memory size. The automatic adjustment can be based on a variety of factors, such as for example, the compression ratio of a given workload, the demands of the operating system kernel, and performance thresholds.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of memory, data storage device, or network.

Furthermore, the illustrative embodiments are described in some instances using particular software tools and data processing environments only as an example for the clarity of the description. The illustrative embodiments may be used in conjunction with other comparable or similarly purposed systems, applications, or architectures.

For example, some illustrative embodiments that are described in conjunction with virtualized logical partitioned environments can be used in conjunction with any data processing system where the illustrative embodiments can be implemented in the manner described within the scope of the invention. For example, an operation described with respect to a single memory device in this disclosure can be similarly implemented with respect to more than one memory devices in certain data processing systems without departing the scope of the invention.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
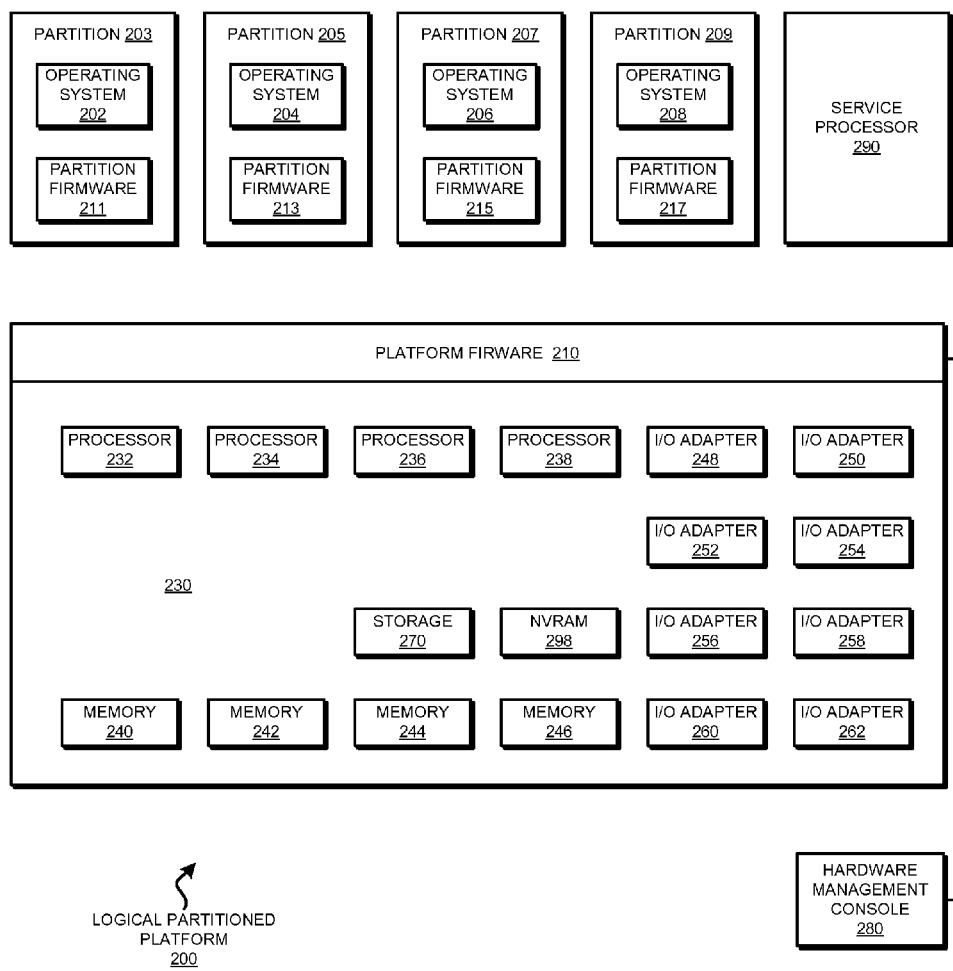
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM or NVRAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
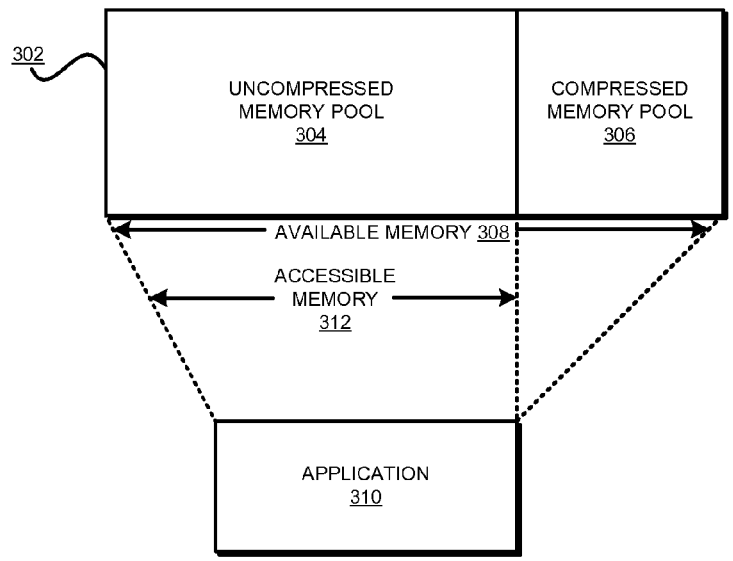
FIG. 3 depicts a block diagram of a memory configuration using which the illustrative embodiments can be implemented.

With reference to FIG. 3, this figure depicts a block diagram of a memory configuration using which the illustrative embodiments can be implemented. Memory 302 is depicted as a single block only as a logical view of memory that includes one or more of memory 240, 242, 244, and 246 in FIG. 2. Memory 302 includes uncompressed memory pool 304 and compressed memory pool 306 which together form available memory 308.

Application 310 may be any software application, certain components of an operating system, a hardware or firmware component of the data processing system that includes memory 302, or a combination thereof. As in present configurations, application 310 may access only uncompressed memory pool 304, which forms accessible memory 312. In some instances, application 310 may access compressed memory pool 306 as well. In such instances, accessible memory 312 may span available memory 308. In any instance configured according to the present technology, accessible memory 312 cannot exceed the size of memory 302 that is available memory 308.

Accessible memory 312 is shown as being all of uncompressed memory pool 304 only for the sake of clarity of the description. In realistic configurations, a portion of uncompressed memory pool 304 may be reserved for storing and manipulating pinned pages or protected pages, and may not be included in accessible memory 312 for certain applications. A pinned page is a page of data that is unmovable from its location in the memory. A protected page is a page of data in memory that may be accessed only by authorized application, such as the operating system kernel.

As depicted in the presently used memory configuration of FIG. 3, disadvantageously, accessible memory 312 includes only a portion of available memory 308 or at most all of available memory 308. Furthermore, disadvantageously, the size of compressed memory pool 306 is specified in the manner described earlier and remains fixed for the duration of the operation of the data processing system that includes memory 302.

Figure 4:
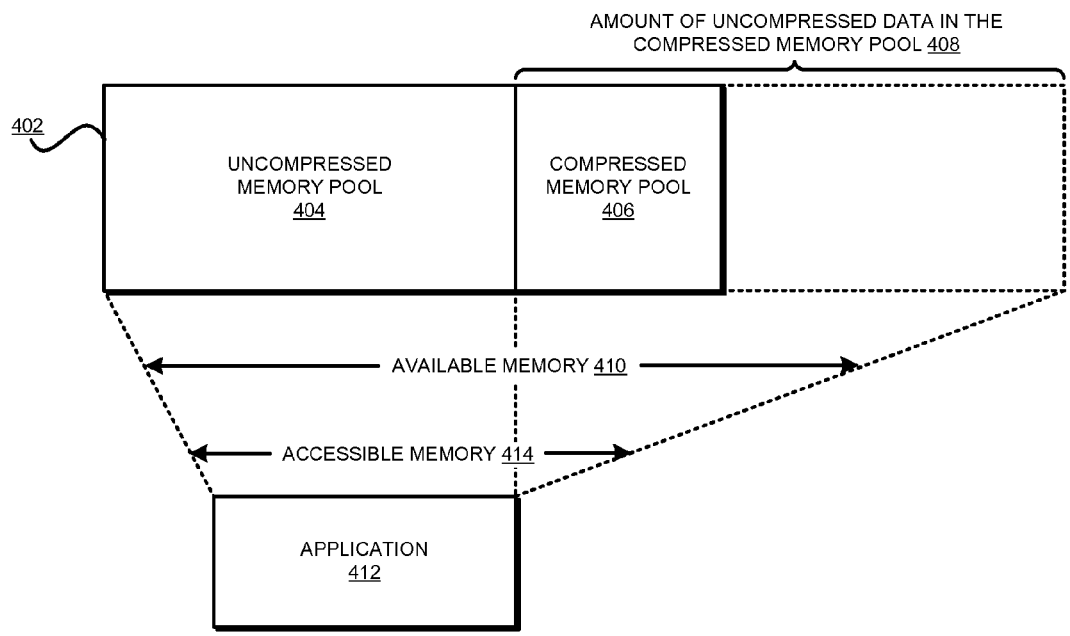
FIG. 4 depicts a block diagram of a memory configuration in accordance with an illustrative embodiment.

With reference to FIG. 4, this figure depicts a block diagram of a memory configuration in accordance with an illustrative embodiment. Memory 402 may be implemented using memory 302 in FIG. 3.

Memory 402 includes uncompressed memory pool 404 and compressed memory pool 406. Block 408 represents the amount of uncompressed data that is stored compressed in compressed memory pool 406.

Unless the compression ratio of compressed data in compressed memory pool 406 is 1:1, to wit, no compression, block 408 will generally be larger than compressed memory pool 406. For example, assume that the compression ratio of the data in compressed memory pool 406 were 3:1—in other words, the data stored in compressed memory pool 406 was compressed to one third the size of the uncompressed data. Further assume, as an example, that the size of memory 402 was 2 GB and the size of compressed memory pool 406 was 1 GB. For this example, block 408 would represent memory (1 GB*3), or 3 GB in size.

Available memory 410 according to the illustrative embodiment is the total of the size of uncompressed memory pool 404 and block 408. Available memory 410 in the above example would therefore be (2 GB–1 GB) of uncompressed memory pool 404+3 GB of block 408=4 GB of available memory 410 using only 2 GB of memory 402. Available memory 410 is the expanded memory according to the illustrative embodiment.

Generally, the size of the expanded memory according to the illustrative embodiment may be computed as follows:

Expanded memory size=(compression ratio*size of the compressed memory pool)+(actual size of the memory−size of the compressed memory pool).

Expanded memory according to the illustrative embodiment may be addressed, such as by application 412, in any manner suitable for a given implementation. For example, virtual addresses spanning available memory 410 may be used in application 412. The virtual addresses may be translated to physical addresses on memory 402 and suitable operations, such as compression or decompression of data, may be performed for physical addresses lying within compressed memory pool 406. Other schemes and mechanisms for addressing available memory 410 will be apparent to those skilled in the art from this disclosure.

By being able to address available memory 410, available memory 410 becomes accessible memory 414 for application 412. Accessible memory 414 according to the illustrative embodiment may be advantageously larger than accessible memory 312 in FIG. 3 according to the present state of technology.

Figure 5:
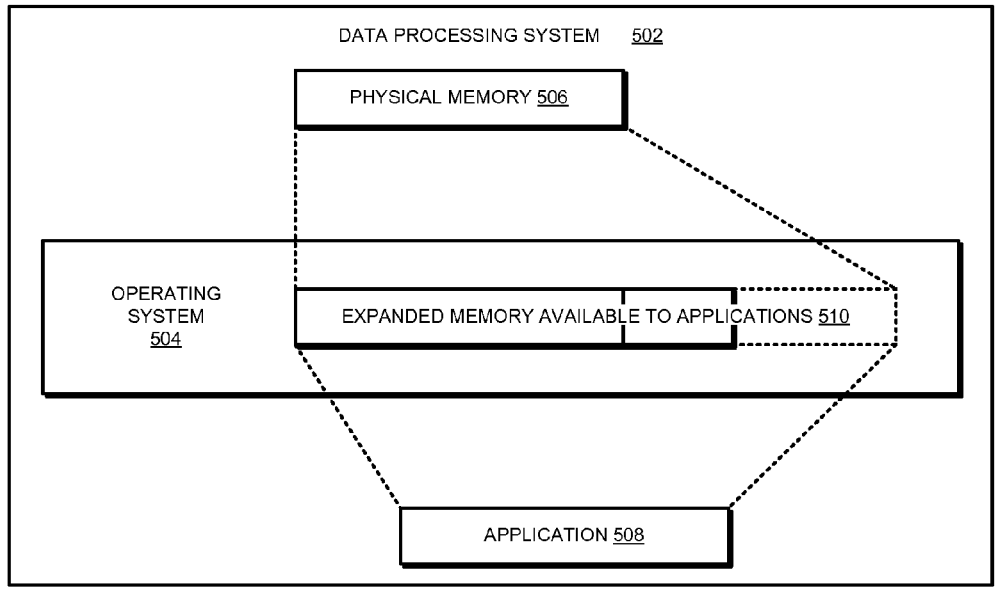
FIG. 5 depicts a block diagram of making expanded memory available in accordance with an illustrative embodiment.

With reference to FIG. 5, this figure depicts a block diagram of making expanded memory available in accordance with an illustrative embodiment. Data processing system 502 may be implemented using, for example, any of partitions 203, 205, 207, or 209 in FIG. 2. Operating system 504 may be implemented using, for example, any of operating system 202, 204, 206, or 208 in FIG. 2. Physical memory 506 may be implemented using any of memory 240, 242, 244, or 246 in FIG. 2.

A component of operating system 504 may manage physical memory 506. Particularly, the management of physical memory 506 may include making physical memory available to applications, such as application 508, for use.

In accordance with an illustrative embodiment, operating system 504 may make expanded memory 510 available to application 508. Expanded memory 510 corresponds to available memory 410 depicted in FIG. 4 and similarly includes a compressed memory pool, an uncompressed memory pool, and additional memory space equivalent of ((compression ratio−1)*compressed memory pool).

Application 508 may address expanded memory 510 in any addressing suitable for a particular implementation. A component of operating system 504 suitably translates such addressing to perform the desired operations with respect to physical memory 506.

Figure 6:
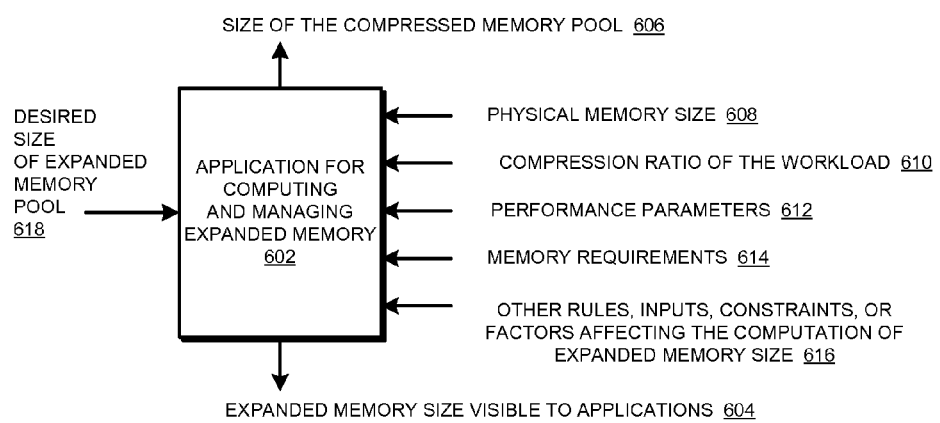
FIG. 6 depicts a block diagram of an application for computing and managing expanded memory in accordance with an illustrative embodiment.

With reference to FIG. 6, this figure depicts a block diagram of an application for computing and managing expanded memory in accordance with an illustrative embodiment. Application 602 may be implemented as a standalone application executing on a data processing system, such as any of partitions 203, 205, 207, or 209 in FIG. 2. Application 602 may also be implemented as a component of an operating system, such as a component of operating system 504 in FIG. 5. Furthermore, application 602 may be implemented in firmware, such as in a memory controller associated with physical memory 506 in FIG. 5.

Application 602 receives several inputs and outputs expanded memory size 604 available to applications executing on a data processing system. Application 602 also outputs size of compressed memory pool 606 that should be set in memory for the workload during a given period.

Application 602 can be configured to receive any number and types of inputs without limitations as may be suitable for a give implementation. For example, application 602 may receive physical memory size 608 as input.

Application 602 may receive compression ratio of workload 610. In one embodiment, instead of receiving compression ratio of workload 610, application 602 may receive other information from which application 602 may compute compression ratio of workload 610.

Application 602 may also receive a set of performance parameters 612. A performance parameter is a desired value of a parameter that measures a certain performance aspect of the data processing system or a component thereof. A set of performance parameters is one or more performance parameters. Some examples of performance parameters 612 may be upper or lower limits on CPU utilization, page faults, memory utilization, disk I/O, wait time for processing a thread or task, and response time of certain applications. A performance parameter may also be a minimum size of the uncompressed memory pool such that thrashing does not occur. Thrashing is the phenomenon when the data processing system becomes so busy in paging pages in and out of memory to accomplish a task in a process that the data processing system fails to accomplish the task in the process within a predetermined time. Of course, these examples of performance parameters are listed only for the clarity of the illustrative embodiments and are not intended to be limiting on the invention. A particular implementation may measure performance using any parameter of a given data processing system, and the same are contemplated within the scope of the invention.

Application 602 may receive memory requirements 614 as an input. Memory requirements 614 may inform application 602 to exclude certain memory space from application 602's computations. For example, memory requirements 614 may include size and location of pinned pages and protected pages, or any combination thereof. Memory requirements 614 may also include memory space to be reserved for operating system, hardware components, such as a graphics card, or applications.

Alternatively, memory requirements 614 may cause application 602 to include only certain memory spaces in application 602's computations. For example, memory requirements 614 may cause application 602 to expand only the space allocated for user or application data in a given memory.

Application 602 may receive any number or type of inputs 616 without limitation. Some examples of other inputs usable in an implementation of application 602 may be rules, policies, or constraints applicable to memory operations. Any factor affecting the computation of expanded memory in the manner of an illustrative embodiment is contemplated as an input to application 602 within the scope of the invention.

Application 602 receives as input 618 a desired size of the expanded memory. In one embodiment, an application or a system parameter may specify a desired size of the expanded memory and such specification may form input 618. In another embodiment, a computation may result in a desired size of the expanded memory, the result forming input 618. For example, an application in a given data processing system may compute or forecast memory requirements during a given present or future period. Such computation may produce a desired size of expanded memory to meet the forecasted memory requirement. The result of such computation may form input 618. A desired size of the expanded memory may be generated, computed, or received in any manner suitable for a given implementation to provide as input 618 to application 602.

Each value that is inputted, computed, specified, derived, or inferred at application 602 is a factor affecting the operation of the memory. The operation of the memory includes making expanded memory available.

Based on the various inputs received at application 602, application 602 determines whether the desired expanded memory size can be made available while satisfying the desired constraints and conditions of the various inputs. Application 602 also determines size of the compressed memory pool 606 that may enable that desired expanded memory size.

Note that size of the compressed memory pool 606 may dynamically vary during the operation of the data processing system where application 602 may be executing. Following are some examples of dynamic variation of size of the compressed memory pool 606. Size of the compressed memory pool 606 may vary for the same desired expanded memory size depending on other inputs to application 602 at a given time during the operation of the data processing system. Size of the compressed memory pool 606 may vary as different desired expanded memory sizes are computed, received, or specified during the operation of the data processing system.

In certain circumstances, application 602 may not be able to make the desired size of the expanded memory available without failing to meet a performance parameter or another constraint. In such circumstances, an embodiment of application 602 may compute and make available an expanded memory size that is less than but as close to the desired expanded memory size as possible.

In one embodiment, a size of deficit may also be produced from application 602. The size of deficit is the portion of the desired expanded memory size that could not be made available. In an embodiment, application 602 may not set the size of the desired expanded memory to be a size smaller by the size of the deficit, but only inform about the size of the deficit. In another embodiment, application 602 may adjust the size of the desired expanded memory by the size of deficits at different times during the operation of the data processing system.

Of course, under certain circumstances, another embodiment of application 602 may be able to make available more than the desired size of the expanded memory. Generally, application 602 may be able to adjust the size of expanded memory made available to applications dynamically, to wit, while the data processing system is in operation, depending on the conditions existing or forecasted in the data processing system. At any given time, expanded memory size available to application 604 may be same as, less than, or greater than desired size of expanded memory 618.

Figure 7:
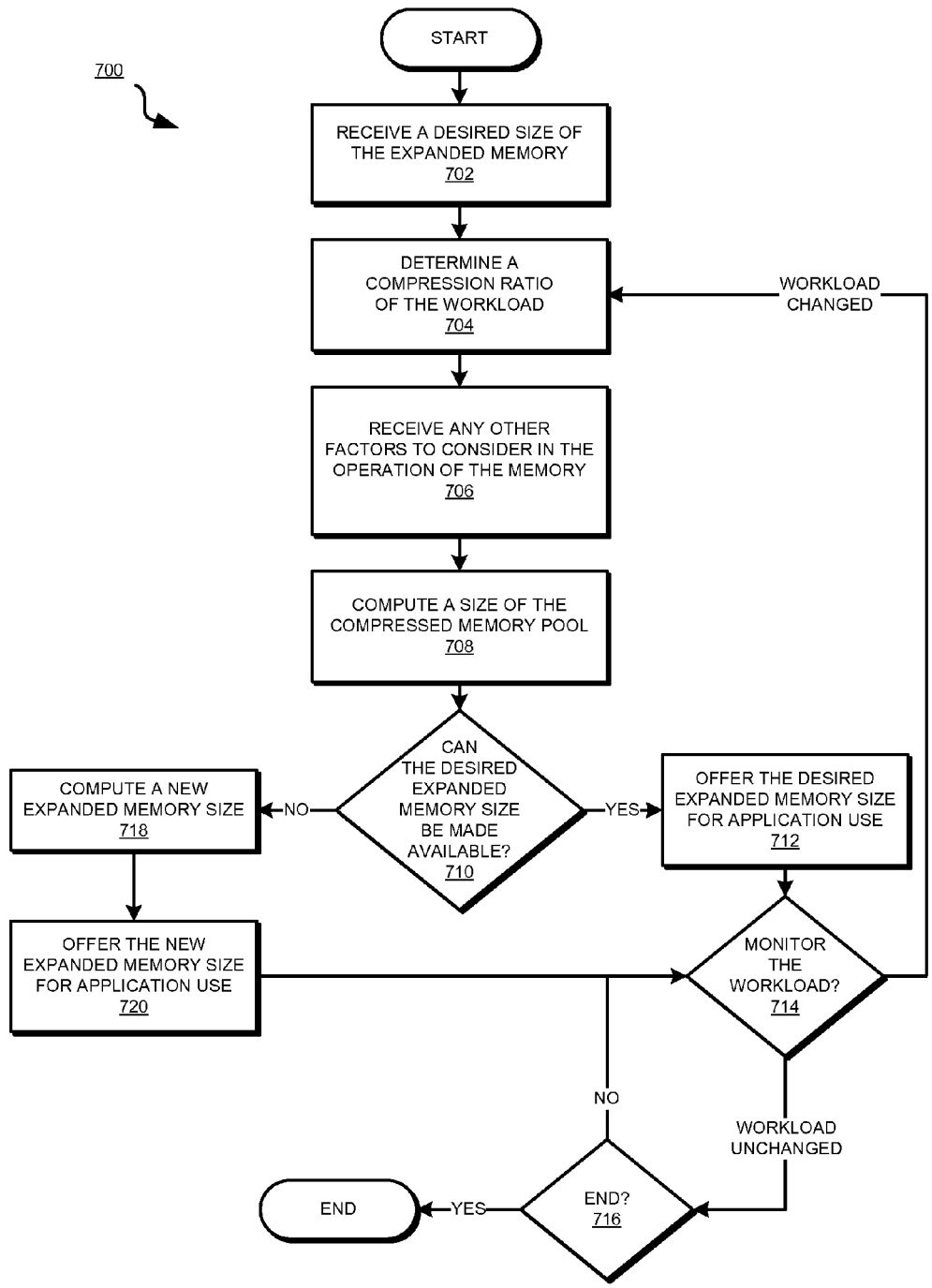
FIG. 7 depicts a flow chart of a process of making available an expanded memory size in accordance with an illustrative embodiment.

With reference to FIG. 7, this figure depicts a flow chart of a process of making available an expanded memory size in accordance with an illustrative embodiment. Process 700 may be implemented in application 602 in FIG. 6.

Process 700 begins by receiving a desired size of the expanded memory (step 702). Process 700 determines a compression ratio of the workload during the period the expanded memory size is desired (step 704). In one embodiment, the compression ratio may be received as an input to process 700. In another embodiment, process 700 may compute the compression ratio in step 704 based on other information.

Process 700 may receive any other factors to consider in the operation of the memory, the operation of the memory including making expanded memory available (step 706). An example of such a factor may be the actual current usage of memory in a partition. Process 700 computes a size of the compressed memory pool based on the desired expanded memory size and other factors (step 708).

Process 700 determines whether the desired expanded memory size can be made available (step 710). If the desired expanded memory size can be made available ("Yes" path of step 710), process 700 offers the desired expanded memory size for application use (step 712).

Process 700 determines whether to monitor the workload (step 714). Workload in a data processing system can change as the data processing system processes different tasks over a period.

In one embodiment, process 700 may be configured to monitor the changing workload. In another embodiment, process 700 may receive information corresponding to changes in the workload, for example, a changed compression ratio of the changed workload. In another embodiment, process 700 may detect changes in the workload in any other direct or indirect ways within the scope of the invention. Step 714 may be modified accordingly to either directly monitor the workload, monitor indirect indicators of a changed workload, or receive information corresponding to a changed workload within the scope of the invention.

If process 700 determines that the workload in the data processing system has changed ("Workload changed" path of step 714), process 700 returns to step 704. If process 700 determines that the workload is unchanged ("Workload unchanged" path of step 714), process 700 proceeds to step 716. In one embodiment, process 700 may determine that a workload is unchanged if the changes in the workload or a corresponding indicator are within a predefined threshold.

In an embodiment, step 714 may also include, as an example, monitoring for a change in the desired size of the expanded memory. In such an embodiment, upon detecting a change in the desired size of the expanded memory, "workload changed" path of step 714 may return to step 702 instead of step 704. The change can be detected in any manner suitable for an implementation. For example, one embodiment may poll for detecting a change, whereas another embodiment may receive a notification when a change event occurs.

The change in workload and the change in the desired size of the expanded memory are described only as examples of factors that process 700 may monitor and are not intended to be limiting on the invention. An implementation of process 700 may monitor additional or different parameters or conditions in a given data processing system within the scope of the invention.

Process 700 determines whether to end process 700 (step 716). If process 700 should end ("Yes" path of step 716), process 700 ends thereafter. If process 700 should not end ("No" path of step 716), process 700 returns to step 714.

Returning to step 710, if process 700 determines that the desired expanded memory size cannot be made available ("No" path of step 710), process 700 computes a new expanded memory size (step 718). Process 700 offers the new expanded memory size for application use (step 720). Process 700 proceeds to step 714 thereafter. In one embodiment, process 700 may not offer a new expanded memory size but offer the unachieved desired expanded memory size and a size of deficit from the desired expanded memory size within the scope of the invention.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for expanding memory size in a data processing system. Using the embodiments of the invention, the data processing environment can make available a larger size memory as compared to the size of the physical memory in the data processing system. Using the embodiments of the invention, an application can access and address expanded memory of a size larger than the size of the physical memory in the data processing system. Having access to the size of the expanded memory may improve an application's performance as compared to when the application only has access to the size of the physical memory.

Furthermore, the invention allows applications to transparently access the expanded memory. In other words, an embodiment of the invention allows an application to access the expanded memory without requiring any code modification in the application to address the expanded memory in a manner different from the manner in which the application presently addresses memory.

Additionally, an application can access the expanded memory according to an embodiment of the invention without any performing additional or different steps. In other words, transparently addressing the expanded memory of the invention includes the application's ability to address the expanded memory in the manner consistent with the manner of addressing presently available memory.

The invention receives an input of the desired size of the expanded memory—a relatively easy parameter to specify as compared to specifying a suitable static size of the compressed memory pool. The invention simplifies certain tasks of memory management. For example, an embodiment of the invention may automate the computation and dynamic adjustment of the compressed memory pool.

The invention can take the form of an entirely hardware embodiment, entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device including computer usable code for expanding memory size, the computer usable code comprising:
    computer usable code for receiving in a data processing system having a memory, a desired size of an expanded memory;
    computer usable code for receiving a first information about a workload in the data processing system;
    computer usable code for computing a size of a compressed memory pool to use with the memory to make the desired size of the expanded memory available;
    computer usable code for configuring a representation of the memory, the representation of the memory appearing to be of a size larger than the size of the memory, the representation of the memory being the expanded memory, and the size of the representation being the size of the expanded memory, wherein the size of the expanded memory is equal to the sum of (i) a product of a compression ratio of the workload and the size of the compressed memory pool and (ii) a difference of the size of the memory and the size of the compressed memory pool; and
    computer usable code for making available the expanded memory such that the memory in the data processing system is usable by addressing the expanded memory.

2. The computer usable program product of claim 1, further comprising:
    computer usable code for receiving an input value corresponding to a performance parameter of the data processing system, wherein the configuring the representation includes determining the size of the representation based on the desired size of the expanded memory, a compression ratio of the workload, and the input value.

3. The computer usable program product of claim 2, wherein the performance parameter is a minimum size of an uncompressed memory pool to avoid thrashing.

4. The computer usable program product of claim 1, wherein the size of the expanded memory excludes a size of a memory space one of (i) used for storing a pinned page, (ii) used for storing a protected page, and (iii) that is reserved for use by an application.

5. The computer usable program product of claim 1, further comprising:
   computer usable code for determining whether the desired size of the expanded memory can be made available; and
   computer usable code for, responsive to the determining being false, making the expanded memory available such that the size of the expanded memory is different from the desired size of the expanded memory.

6. The computer usable program product of claim 1, further comprising:
   computer usable code for determining whether the desired size of the expanded memory can be made available; and
   computer usable code for, responsive to the determining being false, making the expanded memory available together with information about a portion of the desired size that cannot be made available.

7. The computer usable program product of claim 1, further comprising:
   computer usable code for receiving a second information about one of (i) a change in the workload and (ii) a change in the desired size of the expanded memory;
   computer usable code for recomputing the size of the compressed memory pool based on the second information; and
   computer usable code for adjusting the size of the compressed memory pool while the data processing system is operational.

8. The computer usable program product of claim 7, wherein the adjusting leaves the size of the expanded memory unchanged.

9. The computer usable program product of claim 1, wherein addressing the expanded memory is accomplished in the manner of addressing the memory.

10. The computer usable program product of claim 1, wherein the computer usable code is stored in a computer readable storage medium in a data processing system, and wherein the computer usable code is transferred over a network from a remote data processing system.

11. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

12. A data processing system for expanding memory size, comprising:
   a storage device including a storage medium, wherein the storage device stores computer usable program code; and
   a processor, wherein the processor executes the computer usable program code, and wherein the computer usable program code comprises:
      computer usable code for receiving in a data processing system having a memory, a desired size of an expanded memory;
      computer usable code for receiving a first information about a workload in the data processing system;
      computer usable code for computing a size of a compressed memory pool to use with the memory to make the desired size of the expanded memory available;
      computer usable code for configuring a representation of the memory, the representation of the memory appearing to be of a size larger than the size of the memory, the representation of the memory being the expanded memory, and the size of the representation being the size of the expanded memory, wherein the size of the expanded memory is equal to the sum of (i) a product of a compression ratio of the workload and the size of the compressed memory pool and (ii) a difference of the size of the memory and the size of the compressed memory pool; and
      computer usable code for making available the expanded memory such that the memory in the data processing system is usable by addressing the expanded memory.

13. The data processing system of claim 12, further comprising:
   computer usable code for receiving an input value corresponding to a performance parameter of the data processing system, wherein the configuring the representation includes determining the size of the representation based on the desired size of the expanded memory, a compression ratio of the workload, and the input value.

14. The data processing system of claim 13, wherein the performance parameter is a minimum size of an uncompressed memory pool to avoid thrashing.

15. The data processing system of claim 12, wherein the size of the expanded memory excludes a size of a memory space one of (i) used for storing a pinned page, (ii) used for storing a protected page, and (iii) that is reserved for use by an application.

16. The data processing system of claim 12, further comprising:
   computer usable code for determining whether the desired size of the expanded memory can be made available; and
   computer usable code for, responsive to the determining being false, making the expanded memory available such that the size of the expanded memory is different from the desired size of the expanded memory.

17. The data processing system of claim 12, further comprising:
   computer usable code for determining whether the desired size of the expanded memory can be made available; and
   computer usable code for, responsive to the determining being false, making the expanded memory available together with information about a portion of the desired size that cannot be made available.

18. The data processing system of claim 12, further comprising:
   computer usable code for receiving a second information about one of (i) a change in the workload and (ii) a change in the desired size of the expanded memory;
   computer usable code for recomputing the size of the compressed memory pool based on the second information; and
   computer usable code for adjusting the size of the compressed memory pool while the data processing system is operational.

19. The data processing system of claim 18, wherein the adjusting leaves the size of the expanded memory unchanged.

20. The data processing system of claim 12, wherein addressing the expanded memory is accomplished in the manner of addressing the memory.

* * * * *